United States Patent [19]

Bodin

[11] 4,139,902

[45] Feb. 13, 1979

[54] HYPHENATION CONTROLLER

[75] Inventor: Leslie J. Bodin, Stonybrook, N.Y.

[73] Assignee: Burroughs Corporation, Detroit, Mich.

[21] Appl. No.: 832,280

[22] Filed: Sep. 12, 1977

[51] Int. Cl.² ........................ G06F 5/00; B41J 25/00
[52] U.S. Cl. ........................................ 364/900; 400/7
[58] Field of Search ... 364/200 MS File, 900 MS File; 197/19, 20; 400/7

[56] References Cited

U.S. PATENT DOCUMENTS

| | | | |
|---|---|---|---|
| 3,439,341 | 4/1969 | Dolby | 364/900 |
| 3,529,296 | 9/1970 | Friedman | 364/900 |
| 3,537,076 | 10/1970 | Damerau | 364/900 |

*Primary Examiner*—James D. Thomas

[57] ABSTRACT

In a word processing system there is provided: apparatus for automatically centering a string of characters delivered by a source onto a line of a record medium such as a cathode-ray tube display; and apparatus for changing weak or optional hyphens to strong or mandatory hyphens when the hyphen is preceeded or followed by a numeric character.

7 Claims, 7 Drawing Figures

DISPLAY INTERFACE DI  FIG. 7

STORAGE DETECTOR SN  FIG. 6

HYPHENATION CONTROLLER

BACKGROUND OF THE INVENTION

This invention pertains to word processing and more particularly to apparatus and methods of formatting characters on a record medium or display device such as a cathode-ray tube display.

In word processors such as text editors an operator at a keyboard or a remote terminal transmits codes representing characters to a display device such as a cathode-ray tube display. The characters are entered a line at a time and displayed for possible editing or formatting.

In a typical operation the operator will insert text which must be hyphenated when the end of a line is reached. Therefore, a common technique is for the operator when approaching what is thought to be the end of the line to insert hyphens between the syllables of long words. Such hypens are called weak or optional hyphens. When the text is displayed, these hyphens are displayed only if they occur within a certain number of character positions from the end of the line. On the other hand, there are hyphens which occur in numeric information which are associated with code configurations such as part or catalog numbers or are actually minus signs. Such hyphens must be displayed under all circumstances and are called strong or mandatory hyphens. Heretofore, the keyboard was provided either with separate keys for each type of hyphen or a single hyphen key plus a second key which is simultaneously pressed with the weak hyphen key to indicate a strong hyphen. Such solutions lead to added complications for the operator.

A second complication is associated with the centering of a string of characters about a point such as "the middle of the page" on a line of the text. Heretofore, the operator would count the number of characters in the string and perform the necessary calculations to determine where to start the string so that it was centered.

SUMMARY OF THE INVENTION

It is a general object of the invention to provide a word processor which is much simpler for an operator to use.

It is a more specific object of the invention to provide in a word processor hyphenation which requires only one key for insertion of either kind of hyphen.

Briefly, this aspect of the invention contemplates a word processing system operating on a set of characters, the characters of the set being in a first class or a second class and one of the characters of the set being either a first or second type of character wherein a string of characters is transferred serially. Each character of the string other than such one character is transferred unchanged while such one character is transferred as the first type of character if it represented as such first type and an immediately adjacent character of the string is of the first class, and is transferred as the second type of character if an immediately adjacent character of the string is of the second class.

It is another specific object of the invention to provide for the automatic centering of characters about a point on the line of a record medium.

Briefly, this aspect of the invention contemplates a word processor wherein a string of characters are entered serially via a keyboard into a plurality of positions centered about a particular point on a line of a record medium. In particular, there is provided a storage medium having a plurality of addressed cells which are serially assigned to the positions on the line of the record medium, the addresses ranging between first and second values. The cell assigned to the position which includes the particular point receives the first character of the string. All subsequent data characters are considered as pairs of data characters. One data character of the pair is entered into the memory cell having an address one unit closer to the first value than the address of the memory cell in which the previous character was loaded and for the other data character of the pair the contents of each loaded memory cell is shifted to the memory cell having an address one unit closer to the second value and such other data character of the pair is loaded into the memory cell in which the one data character was initially loaded. Thereafter, the contents of the loaded memory cells are serially transferred to the display device.

DESCRIPTION OF THE DRAWING

Other aspects, the features and advantages of the invention will be apparent from the following detailed description when read with the accompanying drawing which shows by way of example and not limitation apparatus for practicing the invention.

DESCRIPTION OF THE INVENTION

Figure 1:
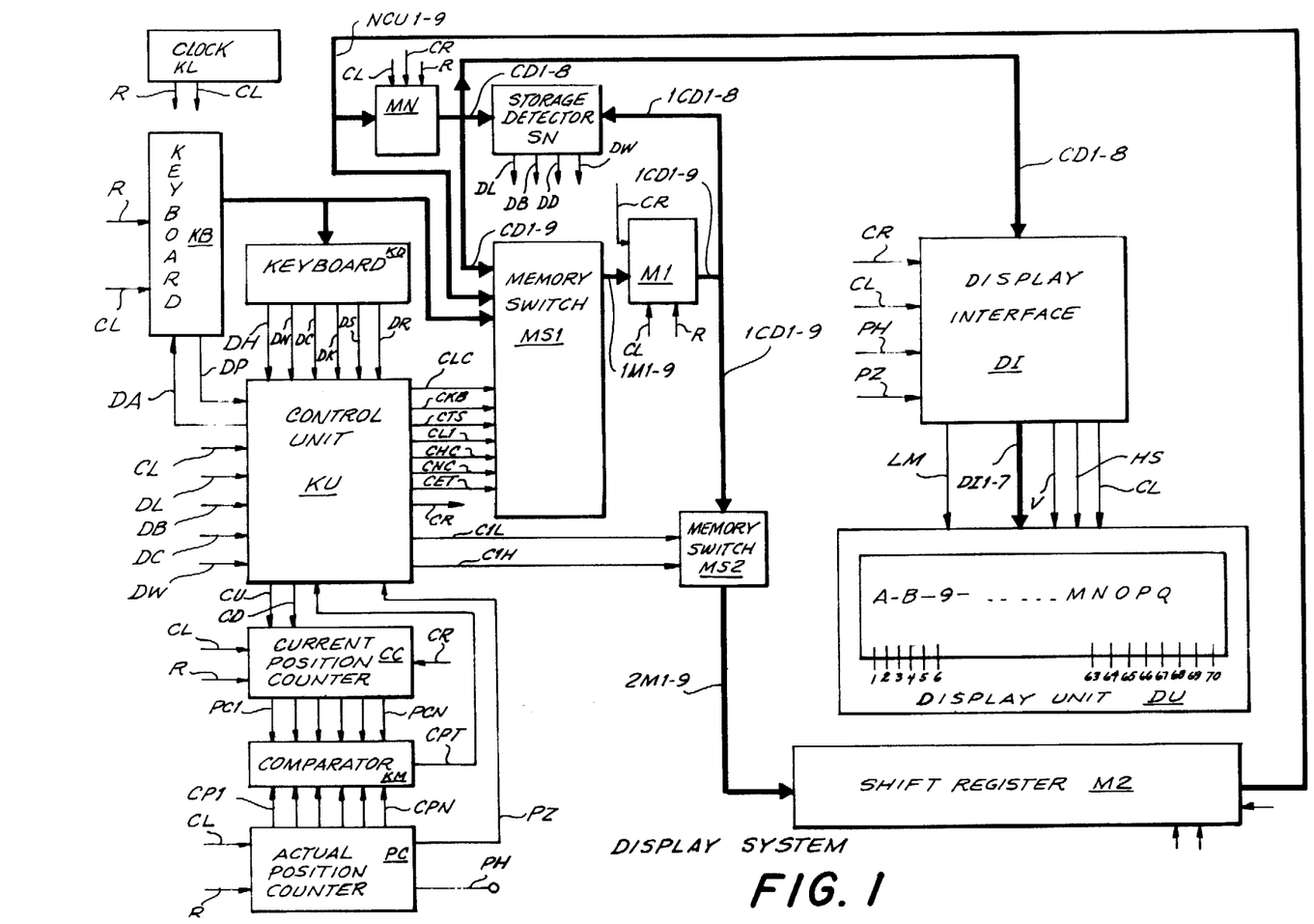
FIG. 1 shows a block diagram of a display system in accordance with the invention.

The display system of FIG. 1 includes a source of characters to be displayed such as keyboard KB interconnected by a loading buffer device to a record medium such as display unit DU of the cathode-ray tube type wherein lines of characters are visually displayed.

The buffer device centers around a memory which can store the data and control bytes for a line of characters to be displayed. The particular memory chosen by way of example is a nine channel shift register which is, say, eighty-two positions long by nine bits wide, i.e., the first seven bits can represent, for example, the different ASCII codes, the eighth bit indicates whether the byte is a control byte or a data byte and the ninth bit indicates whether or not there is a tab stop associated with the byte. The shift register loop comprises, the one position register M1 whose output is connected via the nine parallel lines of cable 1CD1-9 and a memory switch MS2 to the nine lines of cable 2M1-9; and eighty position shift register M2, whose inputs are connected to the line of cable 2M1-9 and whose output is connected via the nine lines of cable NCD1-9 to the input of one position register MN whose output is connected via the nine lines of cable DC1-9, memory switch MS1 and the nine lines of cable 1M1-9 to the inputs of register M1. In general, after data bytes and controls bytes are loaded in the shift register loop they will recirculate until cleared.

The loading of characters is primarily from keyboard KB which generates a nine-bit word comprising an eight bit byte and a tab bit for each keystroke on lines on cable KB1-9 connected to memory switch MS1. As will hereinafter become apparent it is necessary to sense for certain bytes (both data and control) during keyboard entry. This is accomplished by keyboard detector KD. Similarly, storage detector SN connected to the lines of cables CD1-8 and 1CD1-8 sense for particular bytes previously stored in the shift register.

The system is synchronized by clock KL which emits periodically recurring clock pulses on line CL for shifting the characters through the shift register as well as for providing sampling pulses where needed throughout the system. In addition when the system is turned on the clock KL emits a general clear pulse which clears all registers and flip-flops. Synchronization between the recirculating bytes and the loading of the bytes is accomplished by means of the combination of actual position (address) counter PC, current position (address) counter CC and comparator KM.

The insertion of a line of characters into the system will now be described assuming the signal on line R from the clock KL has cleared all the registers and flip-flops and at least one tab stop associated with the particular point on the line about which centering is to take place has been entered into the shift register.

At this time the current position counter will be at a count of one associated with the first byte position of the shift register loop.

Assume, the key for the alphabetic character A of keyboard is stroked (a non-numeric data character). The byte for this character will be emitted onto the lines of cable KB1-9 while a control signal will be emitted on line DP indicating that a character is present at the output of the keyboard. When the comparator KM emits a signal on line CP i.e., when there is the same count in the actual-and-current position counters PC and CC, when the first byte position of the shift register loop is at the inputs of memory switch MS1, control unit KU in response to the coincidence of these signals emits a signal on line CKB to the memory switch MS1 which opens the path from cable KB1-9 to cable 1M1-9, and the control unit terminates a signal on line CLC to the memory switch MS1 which blocks the path from cable CD1-9 to cable 1M1-9 for one clock time. Simultaneously the control unit KU emits: a signal on line CU causing the current position counter CC to unit increment to a count of one indicating that the second byte position of the shift register loop is desired for data entry; and emits a signal on line DA to the keyboard indicating that the character has been accepted. The byte for the alphabetic character A continuously recirculates in the first position of the shift register while the character is being displayed in line position 1 of the display unit DU.

The next character stroked in is a weak hyphen. This time keyboard detector KD senses the hyphen character and emits the DN signal to control unit KU while the DP signal is received from the keyboard KB. When the actual position counter reaches the count of two comparator KM emits a signal on line CP indicating the second byte position of the shift register loop is at the input of the memory switch MS1. The coincidence of the DH, DP and CP causes the control unit KU "to look" at the previously entered byte, i.e., the alphabetic character A in the first byte position. This previously entered character is at this time in the one byte register M1. More particularly, the storage detector SN samples the output of this one byte register on cable 1CD1-8. If the byte represents a numeric character the detector emits a signal on line DD. Since at this time, the signal on line DD is absent indicating a non-numeric character control unit KU, just like for the first character entered, closes the path from the one byte register MN (cable CD1-9) and opens the path from keyboard (cable KB1-9) to the input of one byte register M1. Simultaneously, the control unit KU emits another signal on line DA and another signal on line CU. The weak hyphen code recirculates in the second byte position of the shift register loop, but, as will hereinafter become apparent, is not displayed.

The keyboard KB now enters the alphabetic character B. It is loaded into the third byte position of the shift register loop in the same manner as the first alphabetic character A so that description will not be repeated except to state that the current position counter CC is stepped to the count of four. At this time the shift register stores in its first three positions A-B, assuming time flows from left to right.

The fourth character entered by the keyboard is another weak hyphen which the system handles exactly as the weak hyphen previously entered. The weak hyphen is stored in the fourth position of the register and the current position counter CC is again incremented by one to a count of five. Note the display unit DU at this time also does not display this second weak hyphen.

The keyboard KB now enters the numeric character 9. Keyboard detector KD senses the byte representing the numeric character and emits a signal DN to control unit KU. Just as with an alphabetic character the coincidence of the DP and KM signals causes the insertion of the number 9 into the fifth position of the register via memory switch MS1 in response to the signal on line CKB and the interruption on the line CLC. However, at the same time the signal on line DN causes the control unit KU to look at the previously stored character which is now in one byte register M1. In this case the character in shift register byte position five. In particular, at this time, storage detector SN senses on cable 1CD1-8 a weak hyphen byte and emits a signal on line DW to control unit KU. Control unit KU for one clock time will emit a signal on line C1H and interrupt the signal on line C1L. Memory switch MS2 in response thereto will replace the weak hyphen stored in shift register byte position 4 with a strong hyphen which is displayed in line position 3 of the display unit DU. (Recall the display unit does not display the weak hyphen in shift register byte position 2 between the alphabetic characters A and B).

The sixth character stroked in by the keyboard KB is another weak hyphen. Keyboard detector KD senses this weak hyphen and emits a signal on line DH to the control unit KU. Just as with the second character stroked in (a weak hyphen) the control unit looks at the previously entered character i.e., the numeric character 9 in the fifth byte position of the shift register loop which at this time is in one byte register M1. Now storage detector SN senses a numeric character byte and emits a signal on line DD to control unit KU which in response thereto interrupts the signal on line CLC and emits a signal on line CHC to memory switch MS1 causing the insertion of a strong hyphen into shift register byte position 6 which is displayed at line position 5 by display unit DU. At the same time, control unit KU emits a signal on line DA acknowledging acceptance of the character from the keyboard KB, and emits a signal on line CU for unit incrementing the count in current position counter CP to a count of six.

There has thus been shown apparatus and a method for changing a weak hyphen character to a strong hyphen character in a string of characters when the weak hyphen character is adjacent a numeric character. This is a special case of the generalized concept of changing a first particular character code to another particular character code when the first particular character code is preceeded or followed by one of a given class of character codes.

Now it will be assumed that a tab stop had been previously entered into the shift register loop at byte position 65 so that line position 65 of the display will be the centerline for a string of characters.

After the typing in of the hyphen (the sixth character) the tab key is stroked causing the keyboard to emit on cable KB1-9 the tab control byte along with the usual signal on line DP. The control byte for the tab is entered into the shift register at position 7 just as any other alphabetic or numeric character by means of memory switch MS1. However, in addition keyboard detector KD senses the tab control byte and emits a signal on line DK to control unit KU which in turn emits a signal on line CU to current position counter CC, emits a signal on line CNC to memory switch MS1 and interrupts the signal on line CLC to memory switch MS1. As long as the signal is present on line CNC null bytes are entered into the shift register loop while the absence of the CLC signal prevents recirculation via cable CD1-9. Null bytes are basically filler characters which do not represent data or control characters but merely occupy positions in the loop. At the same time each null bute is entered into the shift register loop the current position counter is unit incremented. When byte position 65 is reached, i.e., when the storage detector SN senses a tab stop byte in register MN and emits a signal on line DB, control unit KU terminates the signal on line CNC and again emits the signal of line CLC repermitting recirculation via cable CD1-9.

The keyboard KB is stroked to emit a center line conrol byte which is entered into byte position 65 of the shift register loop just as any other data character. In addition, the control unit KU receives a signal on line DC from keyboard detector KD which activates the line centering circuitry.

When the next character is stroked in, say the alphabetic character M, it is inserted in byte position 66 in the usual manner. However, immediately after the insertion of this character byte, the first null byte is deleted from the shift register loop causing the character in position 66 to be shifted into position 65. This is accomplished when the storage detector SN detects the first null byte of the string of inserted null characters and emits a signal on line DL. Control unit KU in response thereto emits a signal on line CL1 and interrupts the signal on line CLC.

Memory switch MS1 opens the path from cable NCD1-9 and blocks the path from cable CD1-9. Thus the null byte in register MN is dropped from the loop. This short circuited path remains until the end of the line when actual position counter PC emits a pulse on line PZ to control unit KU which in response thereto terminates the signal on line CL1 and reinitiates the signal on line CLC. The effect of this switching is to shift the character M in byte position 66 to byte position 65. At the same time control unit KU emits a signal on line CD causing counter CP to decrement its count by one so that the current position recorded is byte position 66. When the next character, say a data character N, is stroked in it is inserted into byte position 66 in the usual manner and the current position counter CC incremented to a count of 67.

When the next character say a character O is stroked in the control unit KU goes through the same routine as for the character M, i.e., the first detected null is deleted and, the remaining characters of the string left-shifted one byte position and the current position counter CC first incremented and then decremented so that it retains a count of 67. The result is that character M is in byte position 64, character N in byte position 65 and character O in byte position 66. The next two characters stroked in are character P which is inserted in byte position 67 and character Q which is inserted into byte position 68 followed by the deletion of another null byte and a left-shifting so that character M is in byte position 63, character N in byte position 64, character O in byte position 65, character P in byte position 66 and character Q in byte position 67 as can be seen on the screen of display unit DU of FIG. 1.

To end the line, the keyboard KB inserts a carriage return. This byte is sensed by keyboard detector DS which emits a signal on line DR. This signal causes control unit KV to clear the centering control devices therein and to emit a signal on line CR which initializes the current position counter CC, clears the shift register loop and indicates to the display unit that the line is terminated and a new line is to be started.

The units of the display system of FIG. 1 will now be described in detail.

Figure 2:
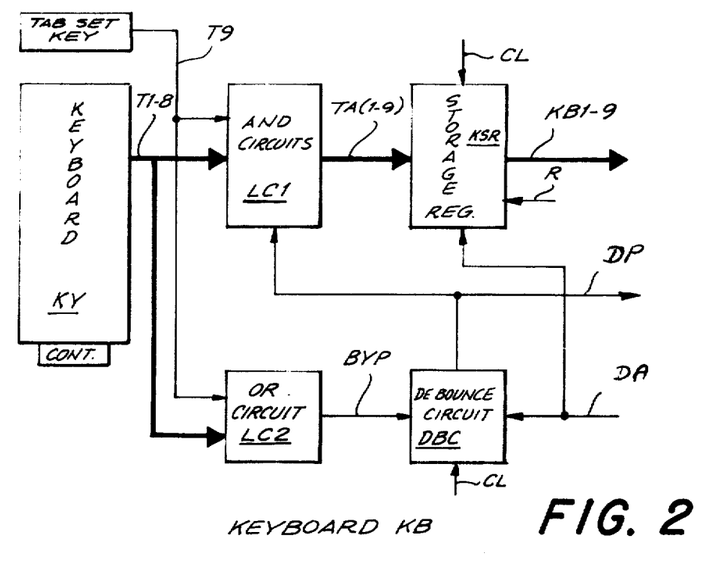
FIG. 2 shows a block diagram of the keyboard of the system of FIG. 1.

The keyboard KB is shown in FIG. 2 including a keyboard KY wherein the stroking of a mechanical keyswitch generates a coded combination of signals on the eigth lines of cable T1-8. Many such keyboards are available. A suitable one is that shown in U.S. Pat. No. 3,586,148 wherein the eigthth bit instead of being a parity bit is only generated when the control button CONT is depressed while a key is stroked. Thus, for data characters such as alphabetic or numeric characters the eighth bit of a byte will be zero whereas for non-data characters such as hyphen or centering the eighth bit will be a one. There is also a tab set key added to the keyboard which when stroked generates a bit only in the ninth position of the unit. It will be assumed that the bits of a byte range from b1 to b9 and that keyboard KB generates the bits b1 to b8 on lines T1 to T8 respectively of cable T1-8 where the binary value of bit b8 on line T8 indicates whether the byte represents a control character or a data character and the bit b9 on line T9 represents a tab stop. The lines T1 to T9 are fed to OR-circuit LC2 which satisfies the following Boolean equation:

$$BYP = T1 + T2 + \ldots + T8 + T9.$$

Thus, whenever any key is depressed a signal is fed to conventional debouncing circuits DBC including cascaded flip-flops which emits a signal on line DP if a key is depressed long enough. The signal is fed to AND-circuits LC1 which also receives the signals of lines T1 to T9 and satisfies the following Boolean equation:

$$T1 \cdot DP = TA1$$

$T_N \cdot DP = TA_N$; where $N = 2$ to $8$ $T_1 \cdot DP = TA 9$.

The signals on lines TA1 to TA9 are fed in parallel to the set inputs of nine flip-flops respectively, which constitute the storage register KSR. The outputs of the flip-flops are connected to the respective lines of the cable KB1-9, and the clear inputs of the flip-flops are connected to line DA. Thus, when a key is stroked the debounce circuit DBC is set causing the signal on line DP to strobe the AND circuits LC1 setting the appropriate flip-flops in the register KSR and to indicate to the control unit KU a character is present. After the control unit KU accepts the character it emits a signal on line DA which clears the flip-flops of the debounce circuit and the storage register KSR preparatory to accepting another character.

Figure 3:
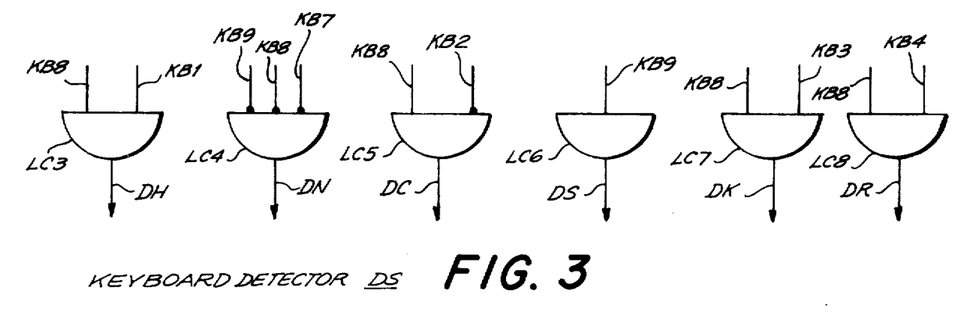
FIG. 3 is a logic diagram of the keyboard detector of the system of FIG. 1.

The keyboard detector DS in FIG. 3 shows the AND-circuits LC3 to LC8 each of which decodes specific bytes. For example, AND-circuit LC3 emits a signal on line DH when the control byte for the hyphen is represented by the presences of signals on lines KB8 and KB1. Note that the detected character is a numeral when there are no signals on lines KB9 (only present when tab key stroked) KB8 (only present for control byte) and KB7 (only present for alphabetic bytes). Thus AND-circuit LC4 is shown with three inverting inputs connected to lines KB7, and KB8 and KB9. It should be realized that the coding shown is by way of example and simplification and that other and more complex codes could be used.

Figure 4:
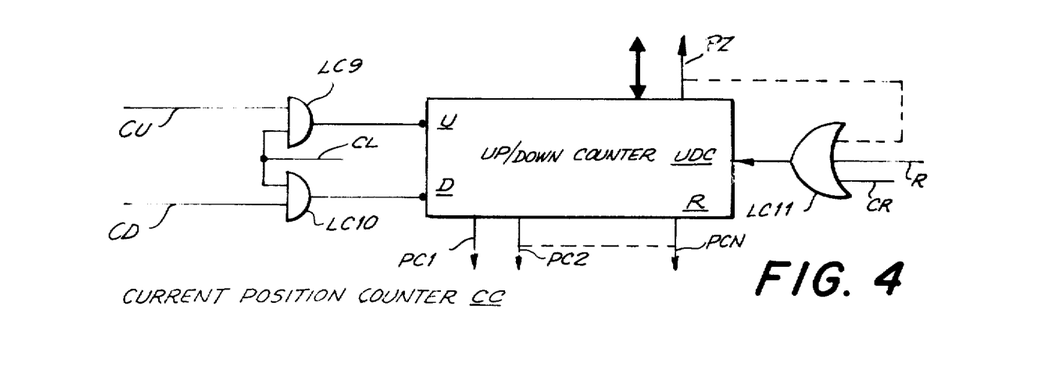
FIG. 4 is a logic diagram of the current position counter of the system of FIG. 1.

The current position counter CC is shown in FIG. 4 centered around the conventional up-down counter UDC having: a count up input U connected to the two-input AND circuit LC9 whose inputs are connected to lines CU and CL, respectively; a count down input D connected to the two-input AND-circuit LC10 whose inputs are connected to lines CD and CL, respectively; a clear input R connected to the two-input OR-circuit LC11 whose inputs are connected to lines R and CR; and outputs connected to lines PC1 to PCN. In operation, initially a signal on line R clears the counter to a count of one. Whenever a signal is present on line CU a clock pulse is fed to the input U, at the trailing edge of this pulse the counter is unit incremented. Similarly, when a signal is present on line CD AND-circuit LC10 passes a clock pulse to the input D and the counter is unit decremented. The outputs on lines PC1 to PCN represent the present count accumulated in the counter.

The actual position counter PC can also be the up-down counter UDC with its input D disabled and line CL connected directly to its input U. In addition, the outputs PC1 to PCN can be connected to a decoder circuit which when it detects a count of eighty-two (the number of byte positions in the shift register loop) emits a pulse on line PZ and also when it detects a count 64 it emits a pulse on line PN. The signal on line PZ in addition to its use in the control unit KU is fed to the input R of the counter to again clear it to a count of one. This is done simply by line PZ replacing line CR into OR-circuit LC11. Thus this counter continuously counts clock pulses modulo eighty-two.

The comparator KM is a convention parallel equality comparator which has N inputs on one side connected to lines PC1 to PCN which are compared to N inputs on its other side connected to lines CP1 to CPN to yield a signal on line CP whenever the two sets of signals are equal.

Figure 5:
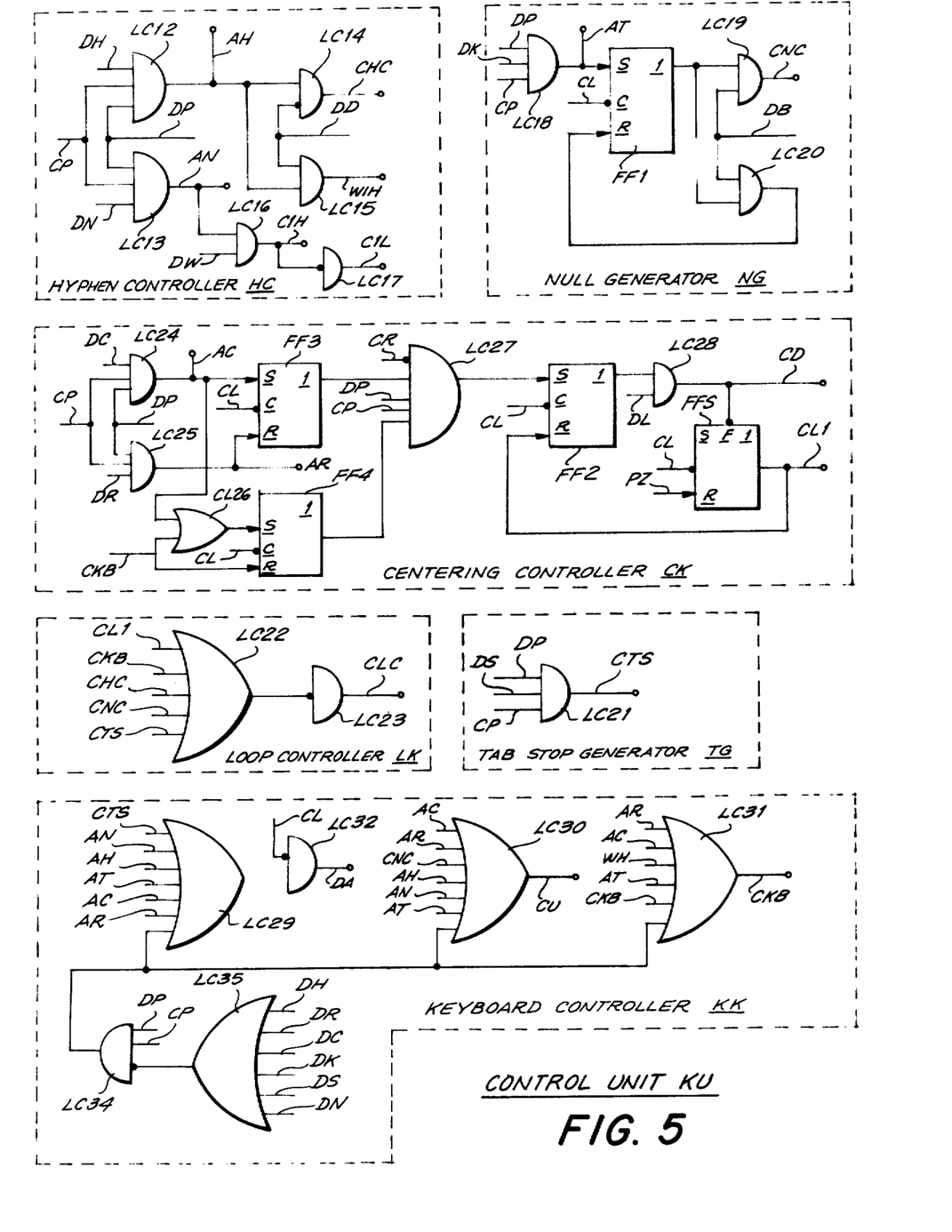
FIG. 5 is a logic diagram of the control unit of the system of FIG. 1.

The memory switch MS1 is a logical network of AND- and OR-circuits which satisfy the following Boolean equations:

$1M1 = [KB1 \cdot CKB] + [NDC1 \cdot CL1] + [CD1 \cdot (CLC + CTS)]$ $1M2 = [KB2 \cdot CKB] + [NDC2 \cdot CL1] + [CD2 \cdot (CLC + CTS)]$ $1M3 = [KB3 \cdot CKB] + [NDC3 \cdot CL1] + [CD3 \cdot (CLC + CTS)]$ $1M4 = [KB4 \cdot CKB] + [NDC4 \cdot CL1] + [CD4 \cdot (CLC + CTS)]$ $1M5 = [KB5 \cdot CKB] + [NDC5 \cdot CL1] + [CD5 \cdot (CLC + CTS)] + [CHC]$ $1M6 = [KB6 \cdot CKB] + [NDC6 \cdot CL1] + [CD6 \cdot (CLC + CTS)] + [CHC]$ $1M7 = [KB7 \cdot CKB] + [NDC7 \cdot CL1] + [CD7 \cdot CLC]$ $1M8 = [KB8 \cdot CKB] + [NDC8 \cdot CL1] + [CD8 \cdot (CLC + CTS)] + [CHC] + [CNC]$ $1M9 = [CTS] + [NDC9]$ The memory switch MS2 is a logical network of AND- and OR-circuits which satisfy the following Boolean equations:

$2M1 = [1CD1 \cdot C1L]$ $2M2 = [1CD2 \cdot C1L]$ $2M3 = [1CD3 \cdot C1L]$ $2M4 = [1CD4 \cdot C1L]$ $2M5 = [1CD5 \cdot C1L] + C1H$ $2M6 = [1CD6 \cdot C1L]$ $2M7 = [1CD7 \cdot C1L]$ $2M8 = [1CD8 \cdot C1L] + C1H$ $2M9 = [1CD9]$ The control unit KU shown in FIG. 5 centers around: the hyphen controller HC; the null generator NG; the centering controller CK; the keyboard controller KK; the loop controller LK; and the tab stop generator TG.

The hyphen controller HC controls the changing of a weak hyphen to a strong hyphen. To accomplish this operation it performs two functions. First, when a numeric character is entered it looks at the immediately previously entered character and if it is a weak hyphen it is changed to a strong hyphen. This function is performed by AND-circuits LC13, LC16, and LC17. In particular when AND-circuit LC13 detects that a numeric character is being entered by the presence of the signal on line DN it samples AND-circuit LC16 for the presence of a signal on line DW indicating the previous character is a weak hyphen. If there is a weak hyphen, the AND-circuit LC16 emits a signal on line C1H and via inverter circuit LC17 terminates the signal on line C1L. The result at memory switch MS2 (FIG. 1) is that the previously entered character is changed from a weak hyphen to a strong hyphen. Second, when a weak hyphen is entered the hyphen controller HC look at the immediately previously entered character, if it is a numeric character the presently entering weak hyphen is changed to a strong hyphen. This is accomplished by AND-circuits LC12, LC14 and LC15. In particular, when the entering of a weak hyphen is detected by the presence of a signal on line DH, AND-circuit LC12 strobes AND-circuits LC14 and LC15. If the previously entered character is a numeric character as indicated by a signal on line DD, the signal on line WH from AND-circuit LC15 is interrupted and a signal is generated on line CHC by AND-circuit LC14. The result is that the weak hyphen byte is blocked from entering the loop by memory switch MS1 (FIG. 1) which instead generates a strong hyphen that is inserted into the loop.

The null generator NG centers around conventional clocked flip-flop FF1 which switches at the trailing edge of the clock pulse on line CL received at is clock input C to assume the state controlled by its other inputs. Thus, when the tab key is stroked, as indicated by the presence of a signal on line DK, AND-circuit LC18 emits a signal which sets flip-flop FF1 whose 1-output is connected to an input of each of the AND-circiuts LC19 and LC20. AND-circuit LC19 starts emitting a signal on line CNC which lasts until a tab stop is detected as indicated by a signal on line DB. More specifically, the signal on line DB is passed via AND-circuit LC20 to clear the flip-flop FF1 which terminates the signal on line CNC.

The tab stop generator TG is AND-circuit LC21 which generates a signal on line CTS for feeding to memory switch MS1 to insert a tab stop into the ninth channel of the loop whenever the tab set key is stroked as indicated by the signal on DS.

The loop controller LK is used to interrupt the connection between the lines of cable CD1-9 and cable 1M1-9. During the presence of a signal on any one of lines CL1, CKB, CHC or CTS connected to inputs of OR-circuit LC22 the OR-circuit emits a signal which is inverted by inverter LC23 interrupting the signal on line CLC connected to its output.

The centering controller CK effectively controls the left shifting of the information of the loop during the centering routine. This is accomplished by the routine that for every other entered character in the field to be centered a null byte is deleted from the loop, all succeeding characters left-shifted by one position, and a character entered in the first available position. More specifically the centering controller CK is build around the "null delete" flip-flop FF2. The centering mode is present when the centering flip-flop FF3 is set by a signal from three-input AND-circuit LC24 in response to a centerline byte represented by the signals on line DC, and is cleared by a signal from three-input AND-circuit LC25 in response to a carriage return byte represented by the signal on line DR. During the centering routine the entered characters are treated in pairs. One character of the pair is entered in the first available position in the usual manner while the other character of the pair is entered in the first available position as usual. However, after the entry the string of previously entered characters in the string to be centered are all left shifted one position. Odd/even flip-flop FF4 controls the pairing. Flip-flop FF4 is initially set by a signal from AND-circuit LC24 passed via two input OR-circuit LC26 to the input S of the flip-flop. Thereafter, the flip-flop is toggled between set and clear by the signals on line CKB (one per character entered). During the centering routine, i.e., when flip-flop FF3 is set, flip-flop FF4 alerts AND-circuit LC27 to pass a pulse signal on line CP for the first character of each pair. This pulse signal sets flip-flop FF2 which alerts two-input AND-circuit LC28. When the first null is detected, a signal is present on line DL and this signal is fed to the force-set input of flip-flop FF5 which immediately sets and starts generating the signal on line CL1. This signal in effect shortens the loop by one position causing the deletion of the first null and the left shifting of all other characters until the "end" of the loop is reached as indicated by a signal on line PZ which clears flip-flop FF5. Note that when the output of circuit LC28 set flip-flop FF5 it also emitted a signal on line CD which caused a unit decrementing of the current or available position counter CC (FIG. 1).

The keyboard controller KK centers around basically three OR-circuits LC29, LC30 and LC31 which respectively generate the signals on lines DA, CU and CKB. The output of OR-circuit LC29 is fed via AND-circuit LC32 whose other (an inverting) input is connected to line CL for timing reasons. Note an input to each of the OR-circuits LC29, LC30, and LC31 is connected to AND-circuit LC34 whose third (an inhibiting) input is connected to the outut of OR-circuit LC35.

Figure 6:
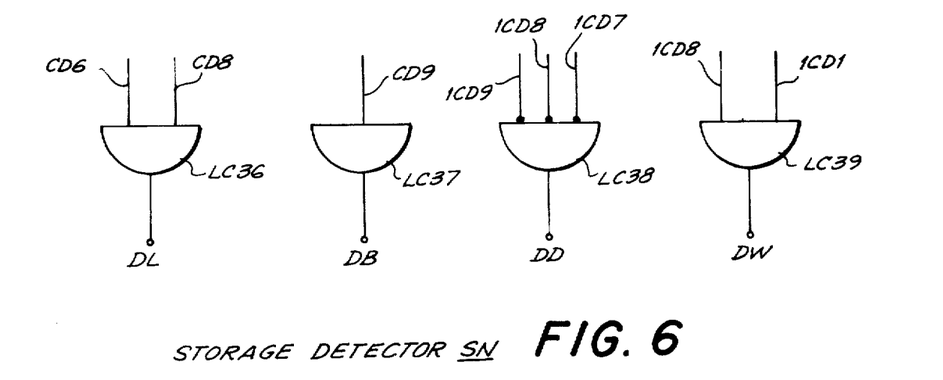
FIG. 6 is a logic diagram of the storage detector of the system of FIG. 1.

The storage detector SN shown in FIG. 6 detects: null bytes with AND-circuit LC36; whether a byte includes a tab stop by means of AND-circuit LC37; whether the byte is a numeric character by means of AND-circuit LC38 having three inverting inputs; and weak hyphens by utilizing AND-circuit L39.

Figure 7:
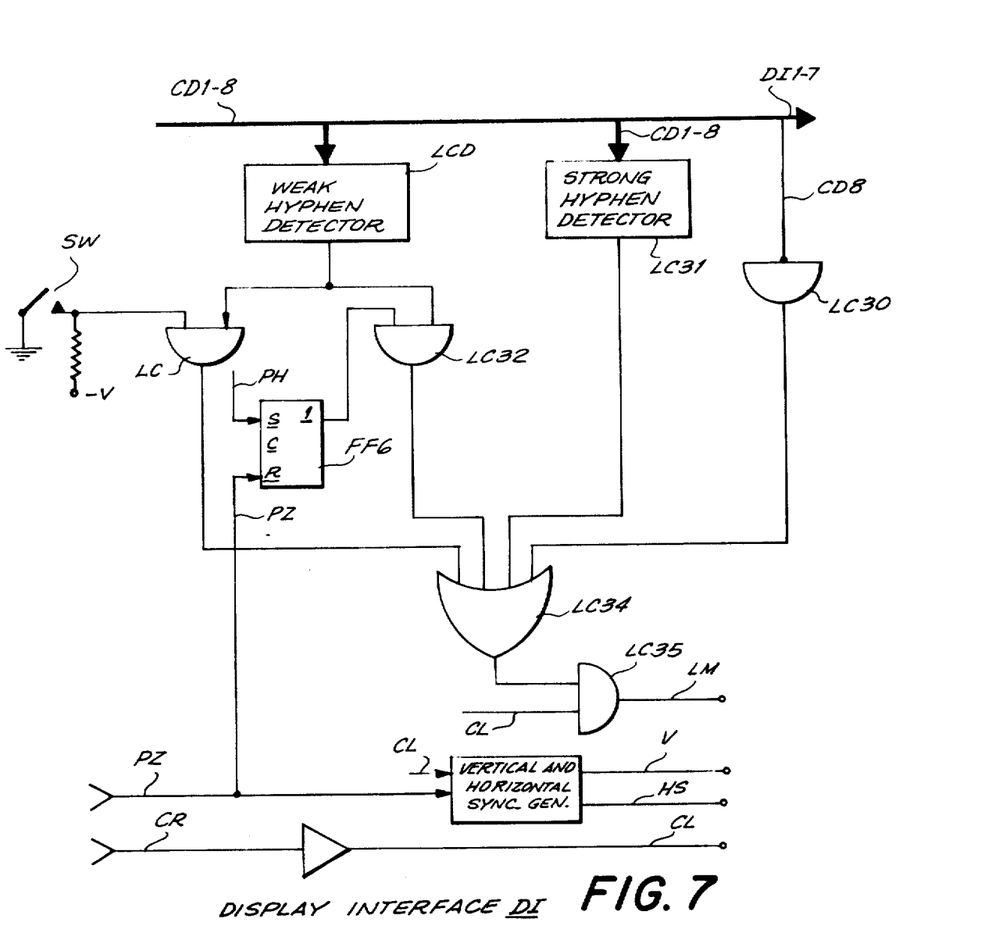
FIG. 7 is a logic diagram of the display interface of the system of FIG. 1.

The display interface DI shown in FIG. 7 primarily controls which bytes are sent to the display unit DU. In particular if the byte represents a noncontrol character as indicated by a zero bit in the b8 position, i.e., no signal on line CD8 of the cable CD1-8, the output of inverter LC30 will be high and fed through OR-circuit LC34 to permit AND-circuit LC35 to pass a clock pulse on line CL to line LM, said clock pulse being used as a stroke pulse to shift the byte on line CD1 to CD7 via the lines DI1 to DI7 of the cable DI1-7 to the display unit DU. If the bit in the b8 position is a one bit, i.e., a signal on line CD8 representing a control character then inverter LC30 passes a low signal.

If the byte on the lines of cable CD1-8 is a strong hyphen then it must be transmitted to the display unit DU. Accordingly, logic circuit LC31 is (an eight input AND-circuit) is provided to sense for the strong-hyphen byte and when present to transmit a high signal via OR-circuit LC34 to AND-circuit LC35 which in response thereto transmits a clock pulse onto line LM. If the byte represents a weak hyphen it will not be transmitted unless it occurs near the end of a line of text or if actually requested by the operator.

The operator can request display by closing the switch SU to alert AND-circuit LC33. If the byte represents a weak hyphen when the switch is closed, then a high signal is passed from weak hyphen detector LCD via AND-circuit LC33 and OR-circuit LC34 to open AND-circuit LC35 which passes a clock pulse on line LM. Finally, if the weak hyphen is, say within the last eighteen characters of a line it will be displayed for hyphenation reasons. Thus, the flip-flop FF6 is set by a signal PH from counter PC when it has a count of, say, sixtyfour and is cleared by the signal PZ when the counter has a count of eightytwo (zero), so that AND-circuit LC32 is alerted to sense for a weak hyphen during the last eighteen positions of a line. If a weak hyphen is present, the output of AND-circuit LC32 go high and this high signal passes through OR-circuit LC34 causing AND-circuit LC35 to emit a strobe pulse on line LM.

In addition, the interface generates by conventional counting techniques and in synchronism with the signals on line CL and PZ the horizontal and vertical syne pulses required by the display unit. Finally, the signal on line CR is transferred to line CL for use as a clear signal by the display unit DU. Of course, in actual practice the display interface will be much more complex to handle other control bytes, tabulations, and hyphenation continues.

The display unit DU which can take many forms generally requires a translator which changes the bytes into dot or line displays on a cathode-ray tube. By way of example, such a unit is shown in U.S. Pat. No. 3,754,229 wherein the store STR can comprise a set of serially available line registers that are sequentially loaded via the display unit DU of the present system with said display unit supplying the signals for lines V, HS, LM and CL. In general lines of bytes representing characters are loaded by the interface DI sequentially into the line registers of the store STR of the patent and sequentially read for translation to dot matrices for display on a cathode-ray tube.

While only one embodiment has been shown and described in detail there will now be obvious to those skilled in the art many modifications and variations satisfying many or all of the objects of the invention without departing from the spirit thereof as defined by the appended claims.

What is claimed is:

1. In a word processing system handling alphabetic and numeric characters as well as weak and strong hyphens, apparatus for controlling the type of hyphen to be transferred to a record medium comprising a source of serially transmitted characters, means for sequentially storing the received characters, and hyphen type changing means responsive to the transmitted characters and the stored characters for changing any weak hyphen to a strong hyphen if one of the characters adjacent thereto in the series is a numeric character.

2. The apparatus of claim 1 wherein said hyphen type changing means comprises first changing means for changing a presently received weak hyphen to a strong hyphen if the immediately preceeding received character was a numeric character, and second changing means for changing a previously received weak hyphen to a strong hyphen if the character immediately following the previous received weak hyphen is a numeric character.

3. In a word processing system operating on a set of characters, the characters of the set being in a first class or a second class and one of the characters of the set being either a first type of character or a second type of character, the method of transferring a string of characters from the set comprising the steps of sequentially transmitting each character of the string other than said one character unchanged, transmitting said one character as said first type of character if it is received as said first type of character and an immediately adjacent character of the string is of said first class, and changing and transmitting said one character as said second type of character if it is received as said first type of character and an immediately adjacent character of the string is of said second class.

4. The method of claim 3 wherein said first class of characters are non-numeric characters, said second class of characters are numeric characters, said first type of character being a weak hyphen, and said second type of character being a strong hyphen.

5. The method of claim 4 further comprising transmitting said one character as a strong hyphen if it is received as a strong hyphen.

6. The method of claim 4 further comprising transmitting said one character as a strong hyphen if it is received as a weak hyphen lying within a certain set of positions of the string.

7. The method of claim 6 wherein said set of positions are adjacent the end of the string.

* * * * *